United States Patent
Zhang

(10) Patent No.: US 11,273,837 B2
(45) Date of Patent: Mar. 15, 2022

(54) VARIABLE BOUNDARY ESTIMATION FOR PATH PLANNING FOR AUTONOMOUS DRIVING VEHICLES

(71) Applicant: Baidu USA LLC, Sunnyvale, CA (US)

(72) Inventor: Yajia Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 178 days.

(21) Appl. No.: 16/580,993

(22) Filed: Sep. 24, 2019

(65) Prior Publication Data
US 2021/0086780 A1   Mar. 25, 2021

(51) Int. Cl.
*B60W 40/10* (2012.01)
*B60W 40/072* (2012.01)
(Continued)

(52) U.S. Cl.
CPC .......... *B60W 40/10* (2013.01); *B60W 40/072* (2013.01); *G05D 1/0088* (2013.01); *G05D 1/0214* (2013.01); *B60W 2050/0083* (2013.01); *B60W 2520/12* (2013.01); *B60W 2552/00* (2020.02); *B60W 2710/20* (2013.01); *G05D 2201/0213* (2013.01)

(58) Field of Classification Search
CPC ............... B60W 40/10; B60W 40/072; B60W 2552/00; B60W 2050/0083; B60W 2520/12; B60W 2710/20; G05D 1/0088; G05D 1/0214; G05D 2201/0213
See application file for complete search history.

(56) References Cited

U.S. PATENT DOCUMENTS 10,671,075 B1 *  6/2020  Kobilarov ............ G05D 1/0088
2011/0190985 A1 *  8/2011  Billberg ................ B60W 40/10
                                                            701/41
(Continued)

FOREIGN PATENT DOCUMENTS

CN        111176272 A  *  5/2020
DE  102018217845 A1  *  5/2019  ........... B62D 15/027

OTHER PUBLICATIONS

Schramm et al, "Single Track Models", 2014, Springer, XIX, whole document. (Year: 2014).*

*Primary Examiner* — Peter D Nolan
*Assistant Examiner* — Kenneth M Dunne
(74) *Attorney, Agent, or Firm* — Womble Bond Dickinson (US) LLP

(57) ABSTRACT

In one embodiment, a method of generating a path for an autonomous driving vehicle (ADV) is disclosed. The method includes obtaining vehicle configuration of the ADV. The vehicle configuration includes a longitudinal state of the ADV and a lateral state of the ADV relative to a discretized point along a reference line. The method further includes estimating one or more boundaries for the lateral state of the ADV with respect to the longitudinal state of the ADV. The estimation of the boundaries includes obtaining vehicle parameters and sensor data of the ADV, using a vehicle kinematic model to estimate the boundaries based on the vehicle parameters and the sensor data, and outputting the estimated boundaries. The method further includes generating an optimal path to control the ADV based on the vehicle configuration and the estimated boundaries.

19 Claims, 9 Drawing Sheets

(51) Int. Cl.
  *G05D 1/00*  (2006.01)
  *G05D 1/02*  (2020.01)
  *B60W 50/00*  (2006.01)

(56) References Cited

U.S. PATENT DOCUMENTS

| | | | |
|---|---|---|---|
| 2018/0017971 A1* | 1/2018 | Di Cairano | B60W 30/02 |
| 2018/0356819 A1* | 12/2018 | Mahabadi | B60W 30/09 |
| 2019/0196487 A1* | 6/2019 | Akiyama | B60W 30/18163 |
| 2019/0220030 A1* | 7/2019 | Ohmura | G01C 21/26 |
| 2020/0278686 A1* | 9/2020 | Liu | G05D 1/0221 |

* cited by examiner

VARIABLE BOUNDARY ESTIMATION FOR PATH PLANNING FOR AUTONOMOUS DRIVING VEHICLES

TECHNICAL FIELD

Embodiments of the present disclosure relate generally to operating autonomous vehicles. More particularly, embodiments of the disclosure relate to variable boundary estimation for path planning for autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, thereby allowing the vehicle to travel with minimal human interaction or in some cases without any passengers.

Motion (or path) planning and control are critical operations in autonomous driving. A path describes the geometric shape of the movement for autonomous vehicles. Various factors affect the desirability of any given path, including those relating to passenger comfort and safety. In path planning, factors, such as collision avoidance of obstacles, change in geometrical properties for smooth paths, and kinematic feasibility for the vehicles to follow an execution path, must be considered for safe and comfort path generation.

In that regard, previous methods and systems for path generation are proposed to address the collision avoidance and the change in geometrical properties, as disclosed in pending U.S. patent application Ser. No. 16/398,838, entitled "Path Generation for Static Obstacle Avoidance", the disclosure of which is incorporated herein by reference.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
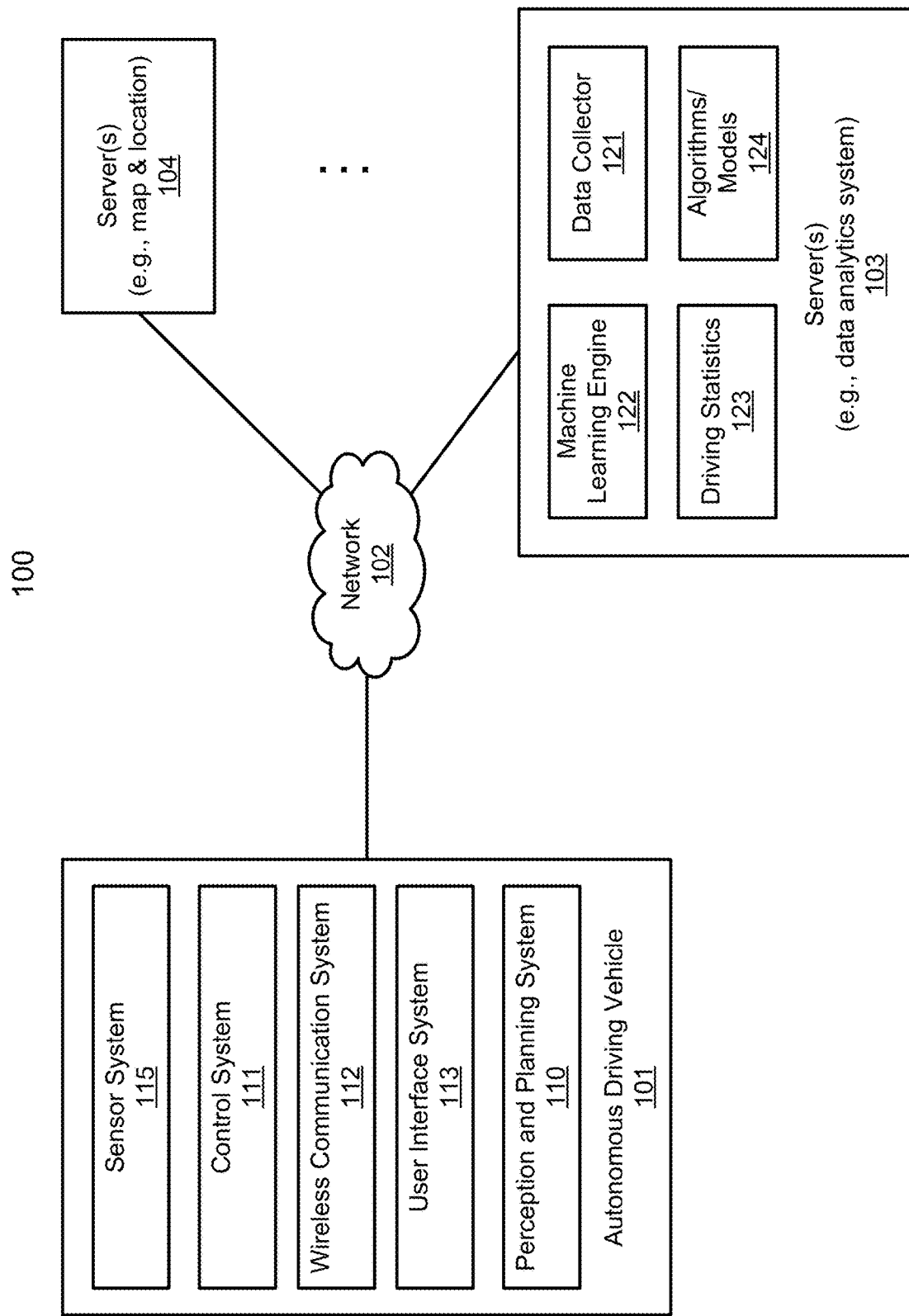
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Some embodiments relate to a method, apparatus, and system for variable boundary estimation for path planning of an autonomous driving vehicle (ADV), taking into account the drivability associated with the path as well as the preference for the path to stay close to the lane center line and away from obstacles with a buffer.

According to some embodiments, methods and systems for planning a path for an ADV are described. In one embodiment, vehicle configuration of the ADV is obtained. The vehicle configuration includes a longitudinal state of the ADV and a lateral state of the ADV relative to a discretized point along a reference line. In one embodiment, one or more boundaries are estimated for the lateral state of the ADV with respect to the longitudinal state of the ADV. The estimation of the boundaries includes: obtaining vehicle parameters and sensor data of the ADV, using a vehicle kinematic model to estimate the boundaries based on the vehicle parameters and the sensor data, and outputting the estimated boundaries. In one embodiment, an optimal path is generated to control the ADV based on the vehicle configuration and the estimated boundaries.

In one embodiment, the vehicle parameters include an optimization variable spatial distance $\Delta s$ between adjacent discretized points, a vehicle maximum steering angle $\alpha_{max}$, a vehicle maximum steering rate $\dot{\Delta}_{max}$, and a distance L between a front axis and a rear axis of the ADV. In one embodiment, the sensor data includes a current vehicle speed v of the ADV.

In one embodiment, to use the vehicle kinematic model to estimate the boundaries, a maximum second order lateral rate of change $l''_{max}$ is determined based on the vehicle maximum steering angle $\alpha_{max}$ and the distance L between the front axis and the rear axis of the ADV, and a maximum third order lateral rate of change $l'''_{max}$ is determined based on the vehicle maximum steering rate $\alpha_{max}$, the distance L between the front axis and the rear axis of the ADV, and the current vehicle speed v of the ADV.

In one embodiment, the maximum second order lateral rate of change $l''_{max}$ is determined as follows:

$$l''_{max} = \frac{\tan(\alpha_{max})}{L},$$

the maximum third order lateral rate of change $l'''_{max}$ is determined as follows:

$$l'''_{max} = \alpha_{max} * \frac{1}{vL}.$$

In one embodiment, a current vehicle steering angle α is determined based on the distance L between the front axis and the rear axis of the ADV and a turning radius R of the ADV.

In one embodiment, prior to obtaining the vehicle configuration of the ADV, the reference line is inputted, and the vehicle configuration is converted from Cartesian space to Frenet frame based on the inputted reference line.

In one embodiment, the vehicle configuration in Cartesian space comprises longitudinal and lateral (x,y) positions of the ADV, an orientation θ of the ADV, and a curvature κ of a road.

In one embodiment, to determine the maximum second order lateral rate of change $l''_{max}$, the ADV is assumed to be nearly parallel to a road.

In one embodiment, the estimated boundaries are $[-l''_{max}, l''_{max}]$ for $l''_i$ and $[-l'''_{max}, l'''_{max}]$ for $l'''_{i \to i+1}$.

In one embodiment, the generated optimal path comprises a vehicle state at a longitudinal distance that corresponds to the discretized point along the reference line.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode. Hereinafter the terms "autonomous vehicle" and "autonomous driving vehicle" (ADV) may be used interchangeably.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
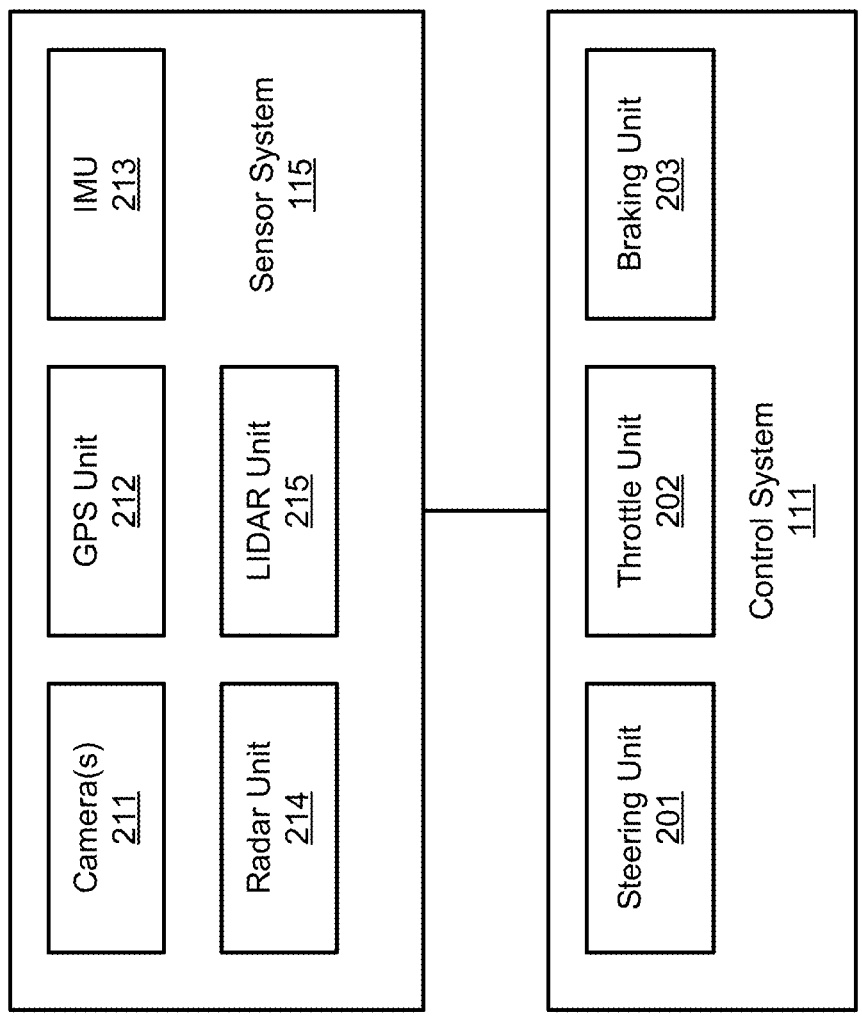
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan a path or a route, and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a path algorithm that receives inputs, constraints, and a cost function, and generates an path for the ADV, taking into account the comfort level associated with the path as well as the preference for the path to stay close to the lane center line and away from obstacles with a buffer. A cost function for the path planning may also be generated as a part of algorithms 124. Algorithms 124 can then be uploaded on ADVs to be utilized during autonomous driving in real-time.

Figure 3A:
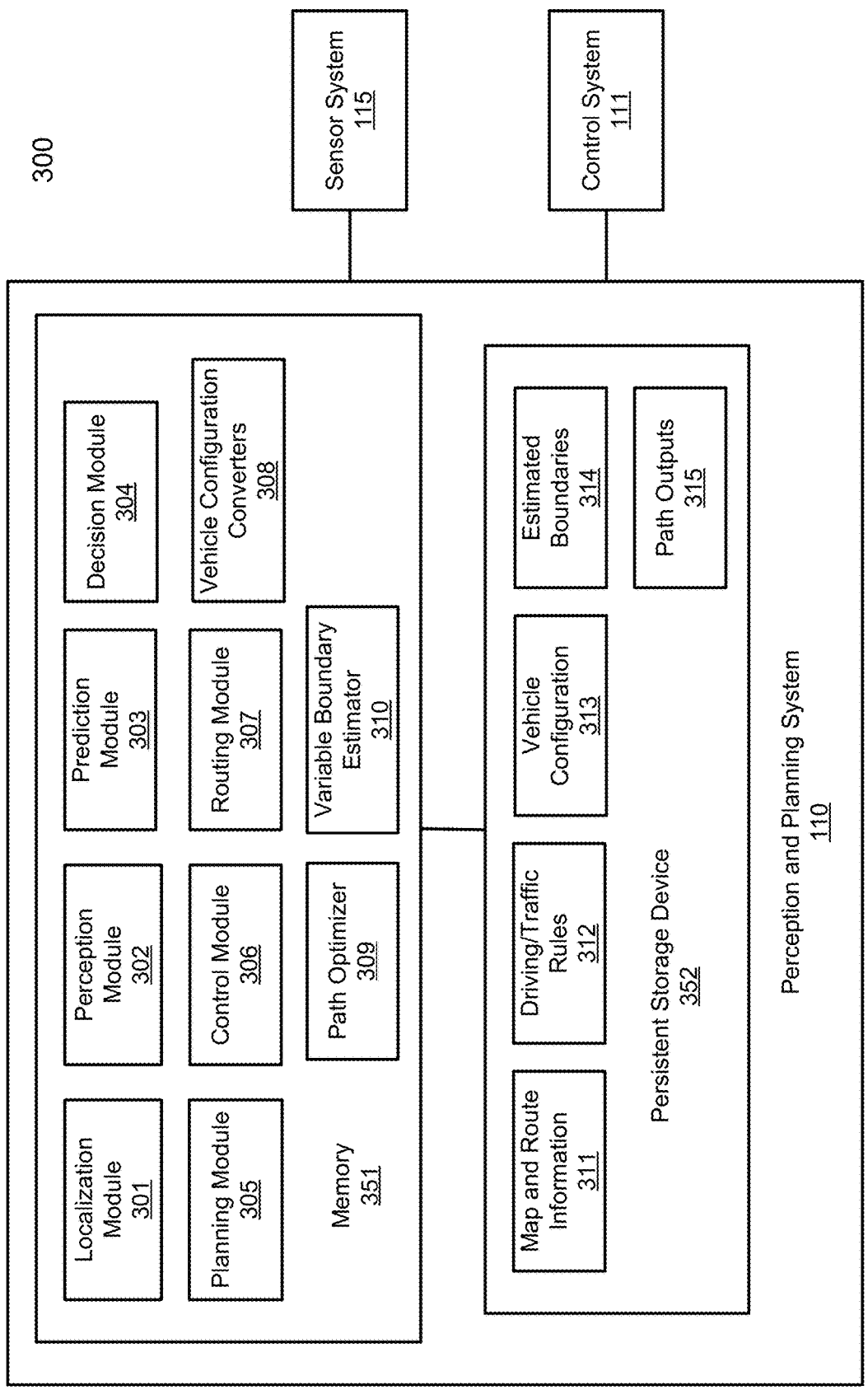
FIGS. 3A-3B are block diagrams illustrating an example of a perception and planning system used with an autonomous driving vehicle (ADV) according to one embodiment.
Figure 3B:
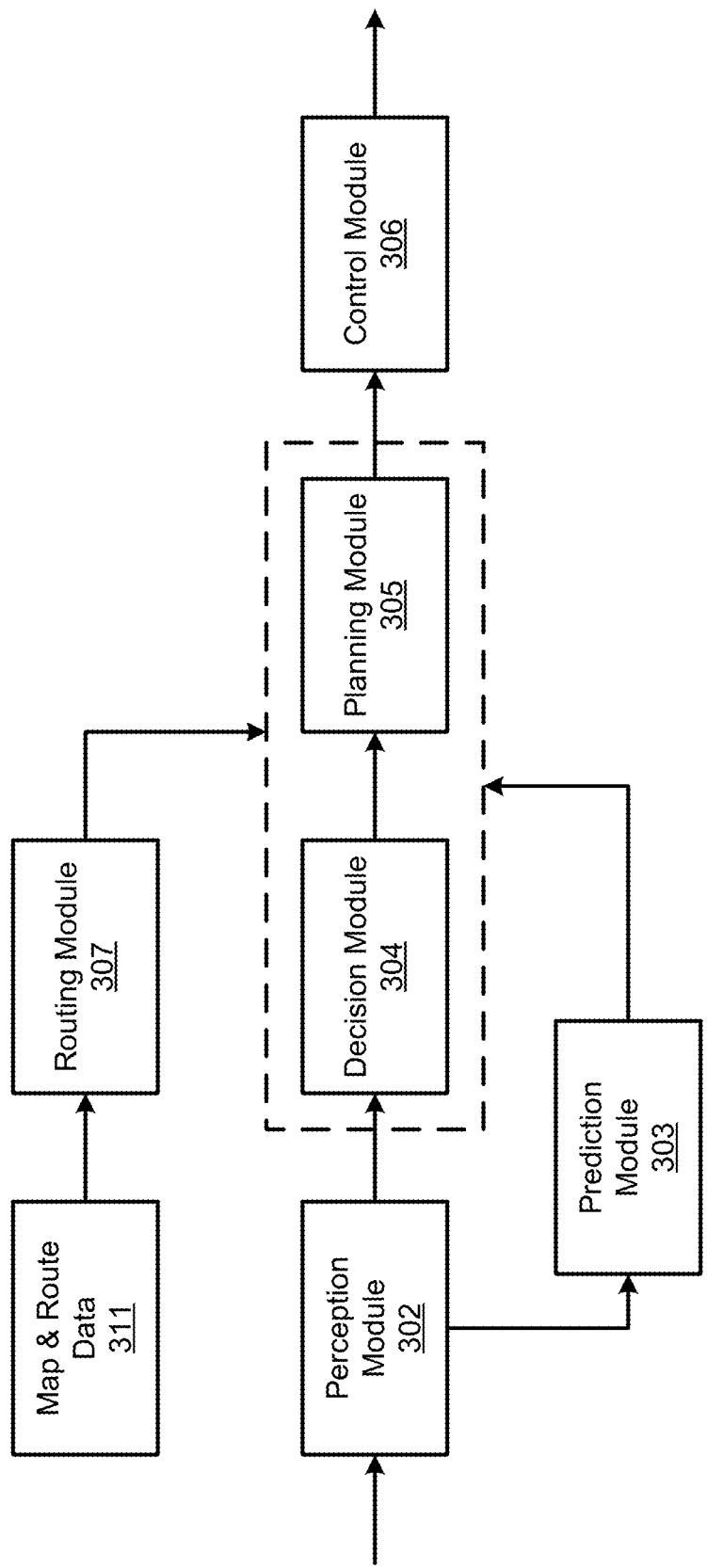

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, vehicle configuration converters 308, path optimizer 309, and variable boundary estimator 310.

Some or all of modules 301-310 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-310 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

As part of the planning process, vehicle configuration converters 308 may obtain a reference line (e.g., a road/lane center line) as input and convert vehicle configuration (e.g., longitudinal pose/position, lateral pose/position, orientation, curvature) from Cartesian space to Frenet frame for a configuration in Frenet frame. Alternatively, converters 308 may take a reference line (e.g., a road/lane center line) as input and convert vehicle configuration (e.g., longitudinal pose/position, lateral pose/position, orientation, curvature) in Frenet frame to a configuration in Cartesian space. While the Cartesian-Frenet and Frenet-Cartesian conversions are shown to be performed by converters 308, in some embodiments, each conversion may be performed by a respective converter. The converted vehicle configuration may be stored in persistent storage device 352 as part of vehicle configuration 313.

Based on vehicle configuration 313 and/or estimated boundaries 314 (discussed in more detail herein below), path optimizer 309 (also referred to as path planner) may perform path optimization, for example in Cartesian space or Frenet frame, and generate path outputs 315 (or optimization results), which may be stored in persistent storage device 352.

Based on vehicle parameters (e.g., optimization variable spatial distance, vehicle maximum steering angle, vehicle maximum steering rate, distance between vehicle's front axis and rear axis) and sensor data (e.g., current vehicle speed) from sensor system 115, variable boundary estimator 310 estimates a boundary for optimization variables so that the path outputs 315 generated by path optimizer 309 is drivable by the ADV (as described in more detail herein below).

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, paths are planned in an SL-coordinate system. The SL-coordinate system may be defined relative to the reference line (road/lane center line). The longitudinal distance, or s-distance, represents the distance along the tangential direction of the reference line. Correspondingly, the lateral distance, or l-distance, represents the distance perpendicular to the s-direction. The longitudinal dimension in the SL space represents a longitudinal distance of a particular object from a current location of the vehicle that is presumably drives along the reference line. The lateral dimension in the SL space represents the shortest distance between the object and the reference line at a particular time or location represented by the longitudinal dimension. Such a graph in the SL space is referred to as an SL graph. In one embodiment, the lateral distance may be simply defined as the distance from the reference line. Therefore, in addition to representation in the Cartesian coordinate system (XY plane), a vehicle position (pose) may be represented in the SL-coordinate system as an ordered pair (longitudinal pose/position "s-pose", lateral pose/position "l-pose"), or simply (s,l), with respect to a reference line.

Figure 4:
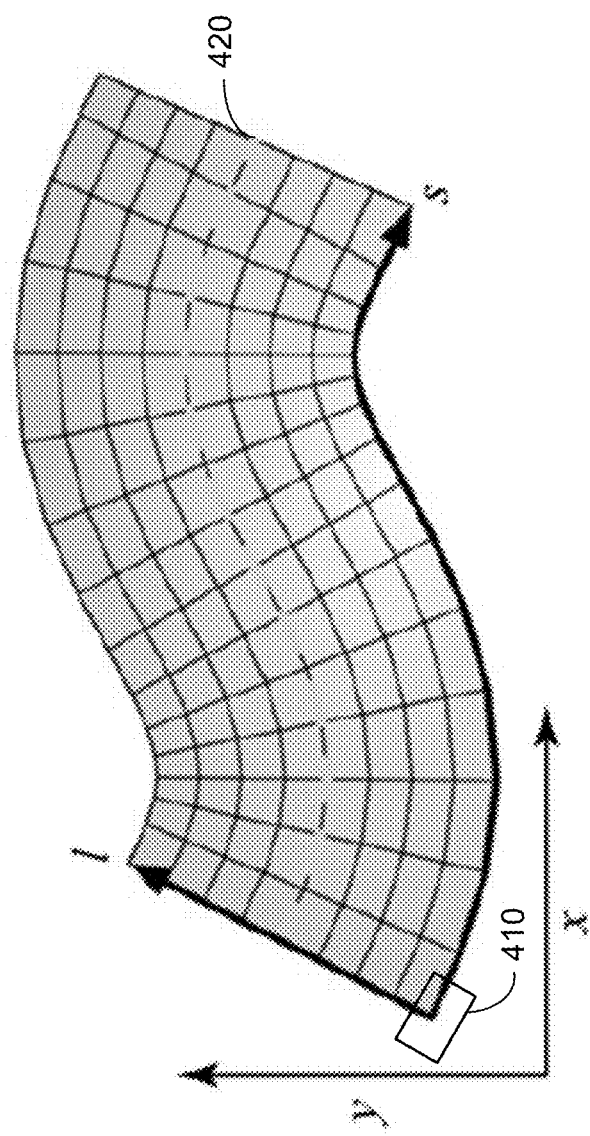
FIG. 4 is a diagram illustrating a vehicle position under an SL-coordinate system under an XY plane according to one embodiment.

Referring to FIG. 4, a diagram 400 illustrating a vehicle position under an SL-coordinate system under an XY plane according to one embodiment is shown. The vehicle 410 has a position (x,y) in the 2D Cartesian coordinate system. Additionally, the vehicle 410 position may also be represented as (s,l) under an SL-coordinate system (e.g., Frenet frame) defined with respect to a reference line 420.

Accordingly, it should be appreciated that in one embodiment, a path can be represented in the SL-coordinate system using a function l(s), where l is the lateral distance to the reference line 420, and s is the longitudinal distance, which is the accumulated distance along the tangential direction of the reference line 420.

In one embodiment, the comfort level associated with the path may be modeled using the first and second derivatives of the lateral distance with respect to the longitudinal distance, e.g., $l' = \frac{dl}{ds}, l'' = d^2l/ds^2$.

They are analogous to the lateral velocity and lateral acceleration, which are the derivatives with respect to time instead. Hereinafter $$l' = \frac{dl}{ds},$$

which is a rate of change of the lateral distance with respect to change in the longitudinal distance, may be referred to as a first order lateral rate of change, and $l''=d^2l/ds^2$, which is a rate of change of the first order lateral rate of change with respect to change in the longitudinal distance, may be referred to as a second order lateral rate of change. In one embodiment, a vehicle state at any longitudinal distance may be represented with a triplet (l,l',l''). Moreover, the lateral jerk of the vehicle may be represented as $l'''_{i \to i-1} = (l''_i - l''_{i-1})/\Delta s$. The meaning of i and $\Delta s$ will be explained in detail below.

In one embodiment, the comfort level associated with the path may be modeled using the first and second derivatives of the longitudinal distance with respect to time, e.g., $$s' = \frac{ds}{dt},$$

$s''=d^2s/dt^2$ They are analogous to the longitudinal velocity and longitudinal acceleration.

Besides comfort, other factors (e.g., collision avoidance, drivability) affect the desirability of the path as well. The closeness to the reference line is one such factor since the vehicle needs to stay at the center of the road/lane if possible. Another factor is the distance to surrounding obstacles. The vehicle needs to keep a certain buffer to account for potential perception errors (e.g., errors or inaccuracies due to sensor data). Yet another factor is the need to maintain the vehicle in parallel to the road with the assumption that the road is nearly straight.

A further factor may be the longitudinal velocity (e.g., speed) of the ADV. The longitudinal velocity may affect the comfort of the passengers in the ADV and/or the desirability of the path. For example, a path that has both a high longitudinal velocity and a high lateral velocity for the ADV may not be as desirable because the path may not be as safe and/or may not be as comfortable for the passengers of the ADV.

Figure 5A:
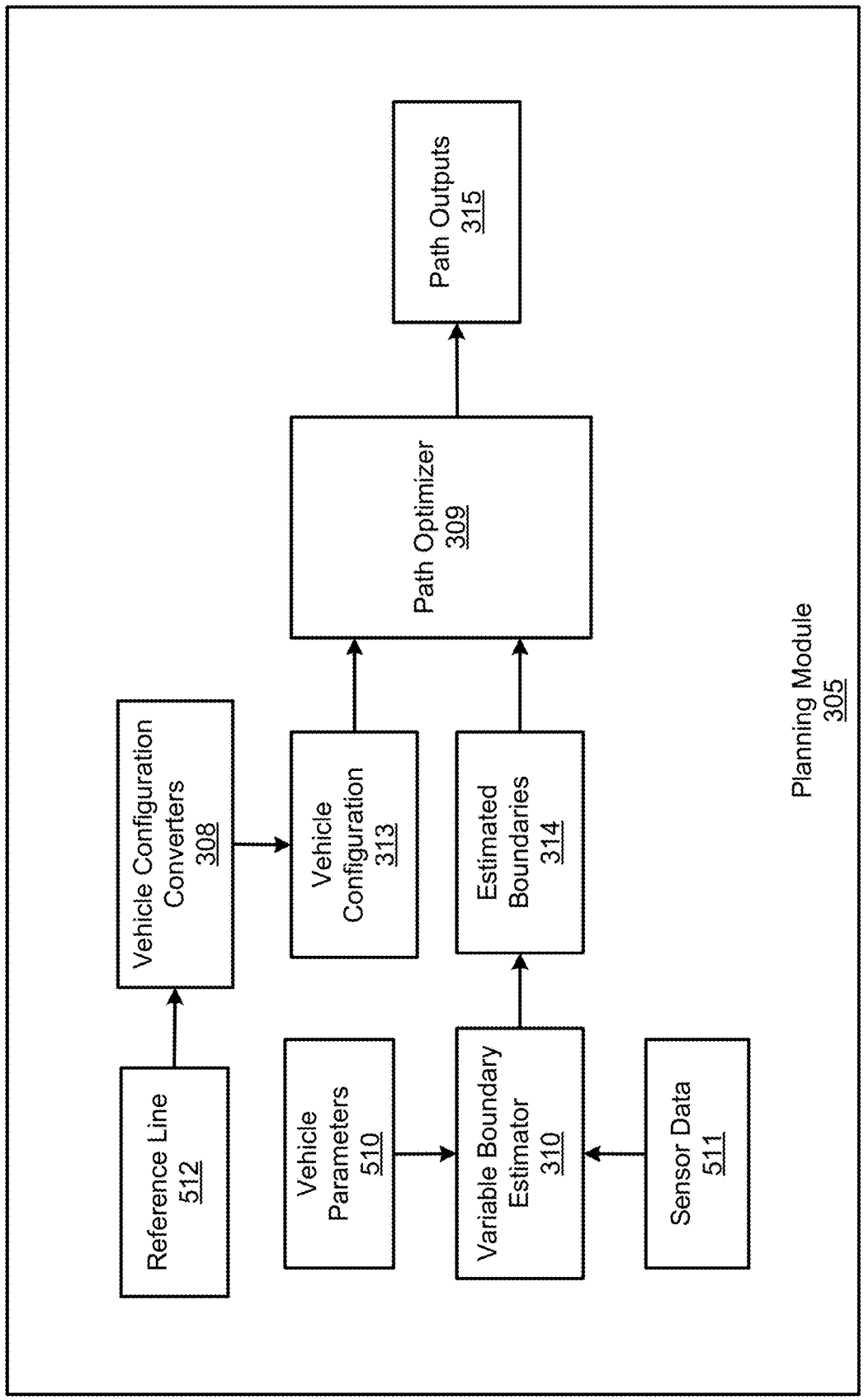
FIG. 5A is a block diagram illustrating various example components involved in the path planning process according to one embodiment.
Figure 5B:
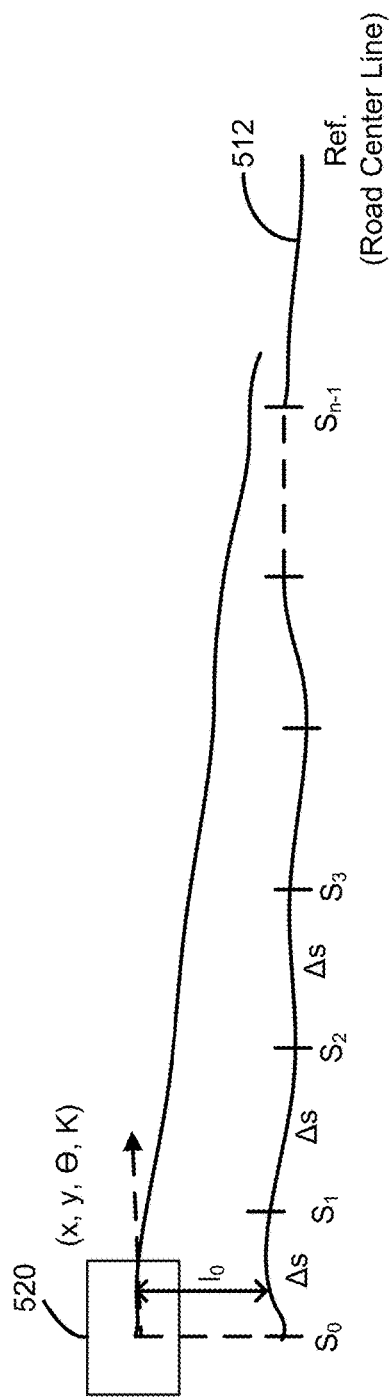
FIG. 5B is a diagram illustrating an example method for obtaining discretized obstacle boundaries under the SL-coordinate system according to one embodiment.

FIG. 5A is a block diagram illustrating various example components involved in the path planning process according to one embodiment, and FIG. 5B is a diagram illustrating an example method for obtaining discretized obstacle boundaries under the SL-coordinate system according to one embodiment. As shown in FIGS. 5A-5B, reference line 512 (e.g., road/lane center line) may serve as input to vehicle configuration converters 308. As previously described, based on reference line 512, converters 308 may perform Cartesian-Frenet conversion of vehicle configuration of vehicle 520 from Cartesian space (x,y,θ,κ) to Frenet frame (s,l,l'=ds/ds, l''=d²/ds²) in order to output vehicle configuration 313 in Frenet frame. Alternatively, converters 308 may perform Frenet-Cartesian conversion of the vehicle configuration from Frenet frame (s,l,l',l'') to a configuration (e.g., vehicle configuration 313) in Cartesian space (x,y,θ,κ). In one embodiment, vehicle configuration 313 may include longitudinal and lateral starting states $(s_0, l_0, l'_0, l''_0)$.

In some embodiments, (x,y) represent the longitudinal and lateral positions of the vehicle, respectively, θ represents the orientation of the vehicle, and κ represents the curvature of the path (or road). For example, κ=0 may indicate that the path is straight, whereas the path may have a degree of curvature otherwise.

In some embodiments, reference line 512 may be represented in a discretized form as follows:

$(x_0^r, y_0^r, \theta_0^r, \kappa_0^r, \dot{\kappa}_0^r = d\kappa_0^r/ds, s_0^r)$ $(x_1^r, y_1^r, \theta_1^r, \kappa_1^r, \dot{\kappa}_1^r, s_1^r)$

...

$(x_{m-1}^r, y_{m-1}^r, \theta_{m-1}^r, \kappa_{m-1}^r, \dot{\kappa}_{m-1}^r, s_{m-1}^r)$ With continued reference to FIGS. 5A-5B, path optimizer 309 may perform path optimization (e.g., in Frenet frame) and output a sequence of configurations (path outputs 315) as follows:

$(s_0, l_0, l'_0, l''_0), (s_1, l_1, l'_1, l''_1), (s_2, l_2, l'_2, l''_2), \ldots, (s_{n-1}, l_{n-1}, l'_{n-1}, l''_{n-1})$ The difference between spatial parameter $s_i \to s_{i+1}$ is a constant $\Delta s$ for all $i \in [0, n-2]$, $i \in \mathbb{Z}$.

In FIG. 5B, discretized points are chosen along the length of the reference line 512 under consideration, including the points at the beginning of the reference line 512 under consideration (e.g., $s_0$) and at the end (e.g., $s_{n-1}$), where any two adjacent discretized points are spaced by a uniform longitudinal distance, referred to as a longitudinal distance discretization resolution $\Delta s$. Also in FIG. 5B, $(l_0, l'_0, l''_0)$ is a lateral starting state (e.g., the vehicle lateral state (l,l',l'') at $s_0$), and $(l_{n-1}, l'_{n-1}, l''_{n-1})$ is a lateral ending state (e.g., the vehicle lateral state (l,l',l'') at $s_{n-1}$).

Variable boundary estimator 310 may estimate one or more boundaries for optimization variables $(l_i, l'_i, l''_i)$ so that the optimization result from path optimizer 309 (e.g., path outputs 315) is drivable by an autonomous driving vehicle (e.g., ADV 101 of FIG. 1). For example, variable boundary estimator 310 may take vehicle parameters 510 (e.g., optimization variable spatial distance $\Delta s$, vehicle maximum steering angle $\alpha_{max}$, vehicle maximum steering rate $\dot{\alpha}_{max}$, distance between vehicle's front axis and rear axis, etc.) and sensor data 511 (e.g., current vehicle speed v) as inputs to produce estimated boundaries 314. Some or all of vehicle parameters 510, for example, may be obtained from a vehicle's manufacturer.

Figure 5C:
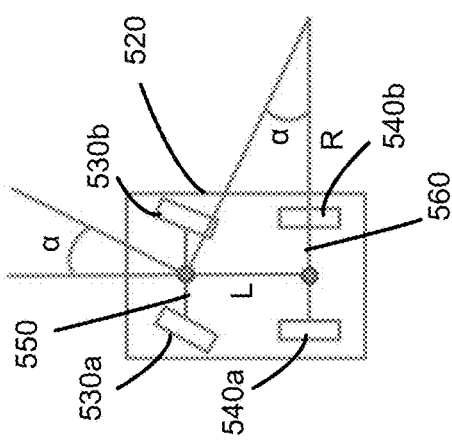
FIG. 5C is a diagram illustrating an example method for variable boundary estimation under the SL-coordinate system according to one embodiment.

In one embodiment, to produce estimated boundaries 314, estimator 310 may use a vehicle kinematic model, such as a bicycle model. Turning now to FIG. 5C, which is a diagram illustrating an example method for variable boundary estimation under the SL-coordinate system according to one embodiment, front axis 550 may be defined by front wheels 530a-b of vehicle 520, and rear axis 560 may be defined by rear wheels 540a-b of vehicle 520. In FIG. 5C, L represents the distance between front axis 550 and rear axis 560, and R represents a turning radius of vehicle 520. In some embodiments, L and R may form the sides of a right triangle, with current vehicle steering angle α being in between R and the hypotenuse of the triangle.

Based on the triangle illustrated in FIG. 5C, $$\tan\alpha = \frac{L}{R}$$

and thus, $$\alpha = \arctan\frac{L}{R}.$$

Assuming the road is nearly straight with $\kappa^r=0$ and $\dot{\kappa}^r=0$, and vehicle 520 is nearly parallel to the road, i.e., vehicle orientation $\theta = \theta^r$, it can be deduced that the second order lateral rate of change $$l'' \approx \frac{1}{R}.$$

Therefore, given vehicle steering angle $$\alpha = \arctan\frac{L}{R} \approx \arctan(L * l''),$$

the maximum second order lateral rate of change $$l''_{max} = \frac{\tan(\alpha_{max})}{L}.$$

Moreover, $$\left|\frac{(\alpha_1 - \alpha_0)}{\Delta t}\right| \leq \dot{\alpha}_{max} \text{(vehicle maximum steering rate)},$$

where $\alpha_0 = \arctan(L * l''_0)$, $\alpha_1 = \arctan(L * l''_1)$, and $$\Delta t = \frac{\Delta s}{v}.$$

Accordingly, $$\left|\frac{(\arctan(L * l''_1) - \arctan(L * l''_0))}{\Delta t}\right| \leq \dot{\alpha}_{max}.$$

In normal cases, $l'' \to 0$, and thus, $\arctan(L * l''_1) \approx L * l''$ and $$\frac{|l''_1 - l''_0|}{\Delta s} \leq \dot{\alpha}_{max} * \frac{1}{vL}.$$

Therefore, a maximum third order lateral rate of change $$l'''_{max} = \dot{\alpha}_{max} * \frac{1}{vL},$$

and the outputted estimated boundaries 314 may be $[-l''_{max}, l''_{max}]$ for $l''_i$ and $[-l'''_{max}, l'''_{max}]$ for $l'''_{i \to i+1}$.

Based on the estimated boundaries 314 and vehicle configuration 313, path optimizer 309 may generate or determine an optimal path (as path outputs 315) for vehicle 520 to take. Path outputs 315 may include values of path variables associated with one or more path objectives. The path variables may be the vehicle state at each longitudinal distance (s,l,l',l") that corresponds to a discretized point along the reference line 512 after the starting point of the reference line 512 up to the end point of the reference line under consideration. In other words, the path variables may comprise: $(s_1,l_1,l'_1,l''_1)$ (e.g., the vehicle state at $s=s_1$), $(s_2, l_2,l'_2,l''_2)$ (e.g., the vehicle state at $s=s_2$), etc., including all the intervening vehicle states up to the ending state at the end point of the reference line 512 under consideration $(s_{n-1},l_{n-1},l'_{n-1},l''_{n-1})$ (e.g., the vehicle state at $s=s_{n-1}$).

Figure 6:
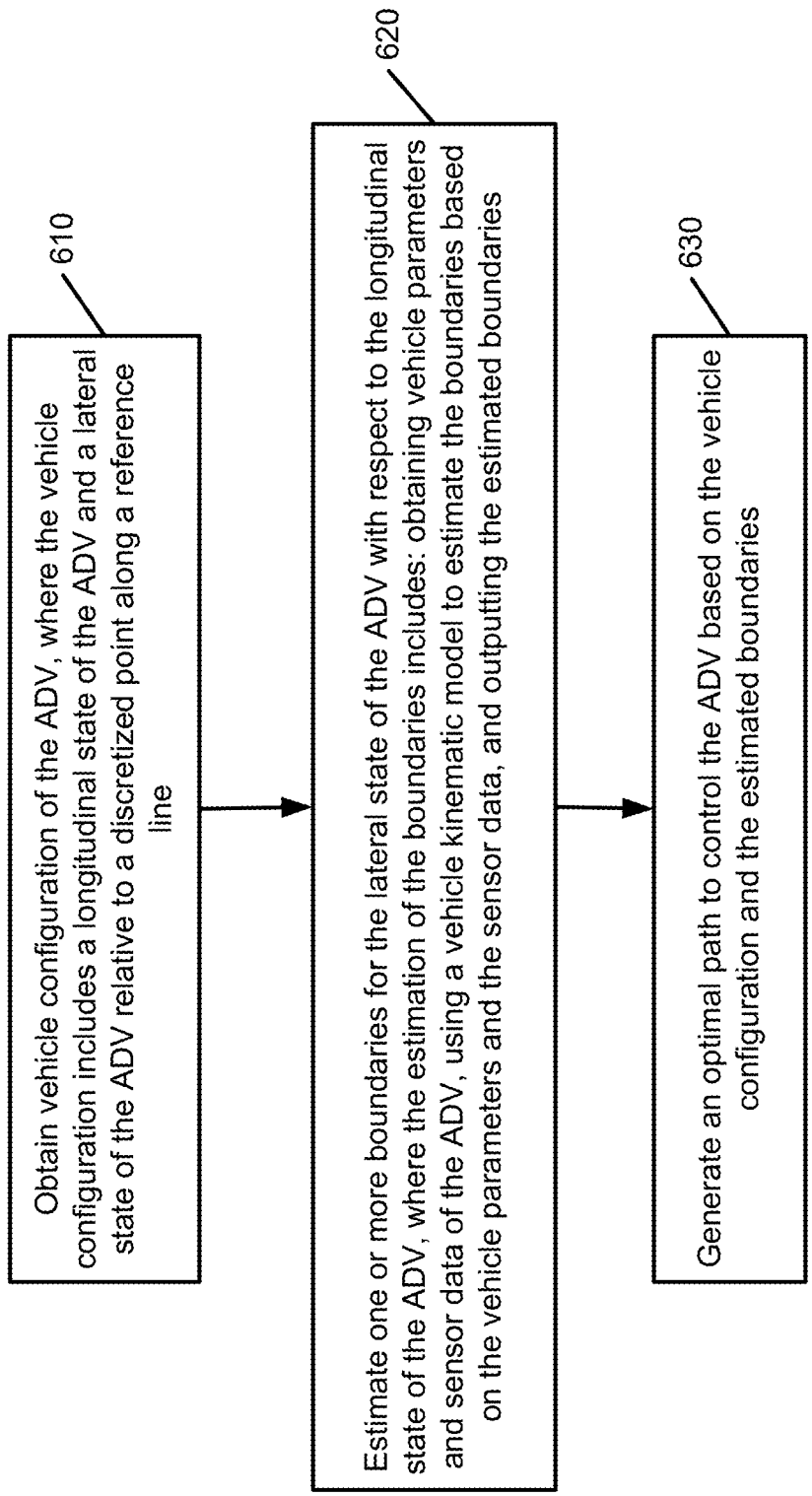
FIG. 6 is a flowchart illustrating an example method for planning a path for an ADV according to one embodiment.

FIG. 6 is a flowchart illustrating an example method for planning a path for an ADV according to one embodiment. Method 600 may be performed by hardware, software, or a combination of both. For example, method 600 may be performed by planning module 305 of FIG. 3A.

Referring to FIG. 6, at block 610, vehicle configuration of the ADV is obtained. The vehicle configuration includes a longitudinal state of the ADV and a lateral state of the ADV relative to a discretized point along a reference line (e.g., reference line 512). At block 620, one or more boundaries are estimated for the lateral state of the ADV with respect to the longitudinal state of the ADV. The estimation of the boundaries includes: obtaining vehicle parameters and sensor data of the ADV, using a vehicle kinematic model to estimate the boundaries based on the vehicle parameters and the sensor data, and outputting the estimated boundaries. At block 630, an optimal path is generated to control the ADV based on the vehicle configuration and the estimated boundaries.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
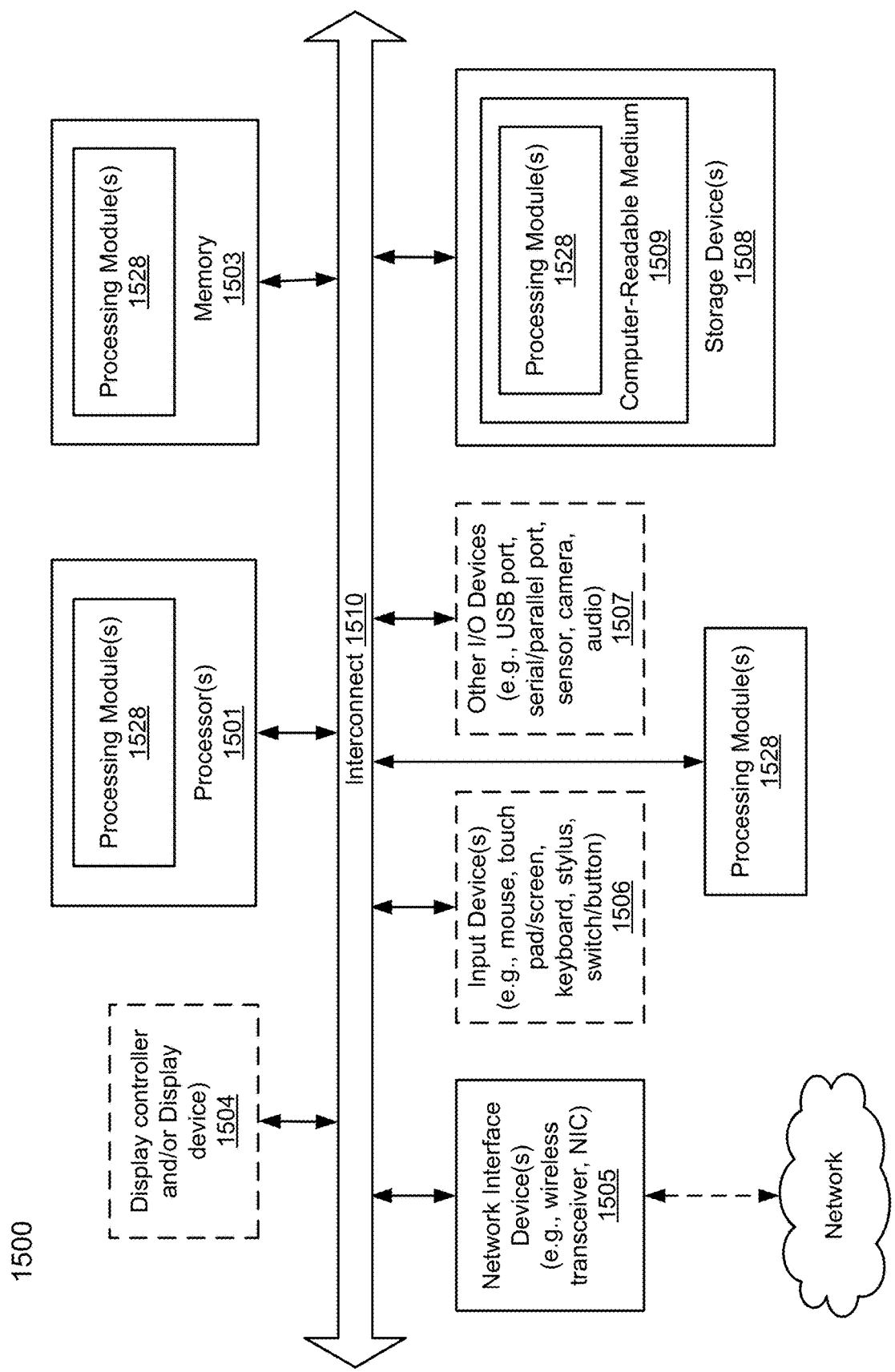
FIG. 7 is a block diagram illustrating a data processing system according to one embodiment.

FIG. 7 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1, and path optimizer 309 of FIG. 3A. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and path optimizer 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of controlling an autonomous driving vehicle (ADV), the method comprising:
    obtaining vehicle configuration of the ADV, the vehicle configuration comprising a longitudinal state of the ADV and a lateral state of the ADV relative to a discretized point along a reference line;
    determining one or more boundaries for the lateral state of the ADV with respect to the longitudinal state of the ADV, the determination of the boundaries comprising:
        obtaining vehicle parameters, and sensor data provided by a plurality of sensors of the ADV,
        using a vehicle kinematic model to determine the boundaries based on the vehicle parameters and the sensor data, and
        outputting the determined boundaries;
    generating an optimal path to control the ADV based on the vehicle configuration and the determined boundaries; and
    controlling the ADV based on the generated optimal path;
    wherein the vehicle parameters include a constant spatial distance $\Delta s$ between adjacent discretized points along the reference line, a vehicle maximum steering angle $\alpha_{max}$, a vehicle maximum steering rate $\dot{\alpha}_{max}$, and a distance L between a front axis and a rear axis of the ADV, and the sensor data includes a current vehicle speed v of the ADV;
    wherein using the vehicle kinematic model to determine the boundaries comprises:
        determining a maximum second order lateral rate of change $l''_{max}$ based on the vehicle maximum steering angle $\alpha_{max}$ and the distance L between the front axis and the rear axis of the ADV, and
        determining a maximum third order lateral rate of change $l'''_{max}$ based on the vehicle maximum steering rate $\dot{\alpha}_{max}$, the distance L between the front axis and the rear axis of the ADV, and the current vehicle speed v of the ADV,
    wherein the maximum steering rate $\dot{\alpha}_{max}$ is determined based at least on the distance L between the front axis and the rear axis of the ADV, the constant spatial distance $\Delta s$ between adjacent discretized points along the reference line, and the current vehicle speed v of the ADV.

2. The method of claim 1, wherein
the maximum second order lateral rate of change $l''_{max}$ is determined as follows:

$$l''_{max} = \frac{\tan(\alpha_{max})}{L},$$

and
the maximum third order lateral rate of change $l'''_{max}$ is determined as follows:

$$l'''_{max} = \dot{\alpha}_{max} * \frac{1}{vL}.$$

3. The method of claim 2, wherein the determined boundaries are $[-l''_{max}, l''_{max}]$ for $l''_i$ and $[-l'''_{max}, l'''_{max}]$ for $l'''_{i \to i+1}$.

4. The method of claim 1, further comprising:
    determining a current vehicle steering angle $\alpha$ based on the distance L between the front axis and the rear axis of the ADV and a turning radius R of the ADV.

5. The method of claim 1, further comprising: prior to obtaining the vehicle configuration of the ADV,
    inputting the reference line, and
    converting the vehicle configuration from a Cartesian space to a Frenet frame based on the inputted reference line.

6. The method of claim 5, wherein the vehicle configuration in the Cartesian space comprises longitudinal and lateral (x,y) positions of the ADV, an orientation $\theta$ of the ADV, and a curvature $\kappa$ of a road.

7. The method of claim 1, wherein determining the maximum second order lateral rate of change $l''_{max}$ comprises assuming the ADV is nearly parallel to a road.

8. The method of claim 1, wherein the generated optimal path comprises a vehicle state at a longitudinal distance that corresponds to the discretized point along the reference line.

9. The method of claim 1, wherein the vehicle kinematic model is a bicycle model.

10. A non-transitory machine-readable medium having instructions stored therein, which when executed by a processor, cause the processor to perform operations, the operations comprising:
    obtaining vehicle configuration of an autonomous driving vehicle (ADV), the vehicle configuration comprising a longitudinal state of the ADV and a lateral state of the ADV relative to a discretized point along a reference line;
    determining one or more boundaries for the lateral state of the ADV with respect to the longitudinal state of the ADV, the determination of the boundaries comprising:
        obtaining vehicle parameters, and sensor data provided by a plurality of sensors of the ADV, using a vehicle kinematic model to determine the boundaries based on the vehicle parameters and the sensor data, and outputting the determined boundaries;

generating an optimal path to control the ADV based on the vehicle configuration and the determined boundaries; and controlling the ADV based on the generated optimal path;

wherein the vehicle parameters include a constant spatial distance Δs between adjacent discretized points along the reference line, a vehicle maximum steering angle $\alpha_{max}$, a vehicle maximum steering rate $\dot{\alpha}_{max}$, distance L between a front axis and a rear axis of the ADV, and the sensor data includes a current vehicle speed v of the ADV, wherein using the vehicle kinematic model to determine the boundaries comprises:

determining a maximum second order lateral rate of change $l''_{max}$ based on the vehicle maximum steering angle $\alpha_{max}$ and the distance L between the front axis and the rear axis of the ADV, and determining a maximum third order lateral rate of change $l'''_{max}$ based on the vehicle maximum steering rate $\dot{\alpha}_{max}$, the distance L between the front axis and the rear axis of the ADV, and the current vehicle speed v of the ADV, wherein the maximum steering rate $\dot{\alpha}_{max}$ is determined based at least on the distance L between the front axis and the rear axis of the ADV, the constant spatial distance Δs between adjacent discretized points along the reference line, and the current vehicle speed v of the ADV.

11. The non-transitory machine-readable medium of claim 10, wherein the maximum second order lateral rate of change $l''_{max}$ is determined as follows:

$$l''_{max} = \frac{\tan(\alpha_{max})}{L},$$

and the maximum third order lateral rate of change $l'''_{max}$ is determined as follows:

$$l'''_{max} = \dot{\alpha}_{max} * \frac{1}{vL}.$$

12. The non-transitory machine-readable medium of claim 11, wherein the determined boundaries are $[-l''_{max}, l''_{max}]$ for $l''_i$ and $[-l'''_{max}, l'''_{max}]$ for $l'''_{i \to i+1}$.

13. The non-transitory machine-readable medium of claim 10, wherein the operations further comprise:

determining a current vehicle steering angle α based on the distance L between the front axis and the rear axis of the ADV and a turning radius R of the ADV.

14. The non-transitory machine-readable medium of claim 10, wherein the operations further comprise: prior to obtaining the vehicle configuration of the ADV, inputting the reference line, and converting the vehicle configuration from a Cartesian space to a Frenet frame based on the inputted reference line.

15. The non-transitory machine-readable medium of claim 14, wherein the vehicle configuration in the Cartesian space comprises longitudinal and lateral (x,y) positions of the ADV, an orientation θ of the ADV, and a curvature κ of a road.

16. The non-transitory machine-readable medium of claim 10, wherein determining the maximum second order lateral rate of change $l''_{max}$ comprises assuming the ADV is nearly parallel to a road.

17. The non-transitory machine-readable medium of claim 10, wherein the generated optimal path comprises a vehicle state at a longitudinal distance that corresponds to the discretized point along the reference line.

18. The non-transitory machine-readable medium of claim 10, wherein the vehicle kinematic model is a bicycle model.

19. A data processing system, comprising:

a processor; and a memory coupled to the processor to store instructions, which when executed by the processor, cause the processor to perform operations, the operations including:

obtaining vehicle configuration of an autonomous driving vehicle (ADV), the vehicle configuration comprising a longitudinal state of the ADV and a lateral state of the ADV relative to a discretized point along a reference line;

determining one or more boundaries for the lateral state of the ADV with respect to the longitudinal state of the ADV, the determination of the boundaries comprising:

obtaining vehicle parameters, and sensor data provided by a plurality of sensors of the ADV, using a vehicle kinematic model to determine the boundaries based on the vehicle parameters and the sensor data, and outputting the determined boundaries;

generating an optimal path to control the ADV based on the vehicle configuration and the determined boundaries; and controlling the ADV based on the generated optimal path;

wherein the vehicle parameters include a constant spatial distance Δs between adjacent discretized points along the reference line, a vehicle maximum steering angle $\alpha_{max}$, a vehicle maximum steering rate $\dot{\alpha}_{max}$, and a distance L between a front axis and a rear axis of the ADV, and the sensor data includes a current vehicle speed v of the ADV;

wherein using the vehicle kinematic model to determine the boundaries comprises:

determining a maximum second order lateral rate of change $l''_{max}$ based on the vehicle maximum steering angle $\alpha_{max}$ and the distance L between the front axis and the rear axis of the ADV, and determining a maximum third order lateral rate of change $l'''_{max}$ based on the vehicle maximum steering rate $\dot{\alpha}_{max}$, the distance L between the front axis and the rear axis of the ADV, and the current vehicle speed v of the ADV, wherein the maximum steering rate $\dot{\alpha}_{max}$ is determined based at least on the distance L between the front axis and the rear axis of the ADV, the constant spatial distance Δs between adjacent discretized points along the reference line, and the current vehicle speed v of the ADV.

* * * * *